US006912378B2

(12) United States Patent
Morewitz, II et al.

(10) Patent No.: US 6,912,378 B2
(45) Date of Patent: Jun. 28, 2005

(54) MULTIPLE BAND SCANNING RECEIVER SYSTEM HAVING DATA AND SPEECH SEARCHING CAPABILITY

(75) Inventors: Herbert Morewitz, II, Newport News, VA (US); Jeffrey A. Pawlan, San Jose, CA (US)

(73) Assignee: Raddscann Corporation, Newport News, VA (US)

( * ) Notice: Subject to any disclaimer, the term of this patent is extended or adjusted under 35 U.S.C. 154(b) by 756 days.

(21) Appl. No.: 09/855,482

(22) Filed: May 15, 2001

(65) Prior Publication Data

US 2002/0173283 A1 Nov. 21, 2002

(51) Int. Cl.[7] .................................................. H04B 1/18

(52) U.S. Cl. ................ 455/150.1; 455/130; 455/161.1; 455/132

(58) Field of Search .............................. 455/130, 150.1, 455/161.1, 186.1, 161.3, 132, 133, 184.1, 158.1

(56) References Cited

U.S. PATENT DOCUMENTS 4,887,308 A * 12/1989 Dutton .................... 455/186.1
5,249,303 A * 9/1993 Goeken ................... 455/161.3
5,457,815 A * 10/1995 Morewitz, II ............ 455/161.1
5,613,230 A * 3/1997 Gottfried et al. ........ 455/161.3
6,011,854 A 1/2000 Van Ryzin ................... 381/77
6,125,267 A * 9/2000 Monge-Navarro et al. ....................... 455/184.1
6,151,572 A 11/2000 Cheng et al. ............... 704/235

* cited by examiner

*Primary Examiner*—Edward F. Urban
*Assistant Examiner*—Lana Le
(74) *Attorney, Agent, or Firm*—Peter J. Van Bergen

(57) ABSTRACT

A receiver system and audio processing method for use therewith are provided. The system includes pairs of receivers with each pair receiving broadcasts on a unique broadcast band. A decoder converts the received signal to a character representation thereof. A user selects a broadcast band and frequency as well as search criteria. One of the receivers is tuned to the user-selected frequency and outputs the program associated with the received broadcast signal to an audio output device. Simultaneously, the broadcast band associated with each of the remaining receivers is scanned with the character representation of each of these broadcast signals associated therewith being compared with the search criteria. A match with the search criteria is identified to allow the user to uncouple the tuned receiver from the audio output device and couple a designated one of the receivers that produced the match to the audio output device.

15 Claims, 3 Drawing Sheets

MULTIPLE BAND SCANNING RECEIVER SYSTEM HAVING DATA AND SPEECH SEARCHING CAPABILITY

FIELD OF THE INVENTION

The invention relates generally to receiver systems, and more particularly to a receiver system that can audibly reproduce one received signal while simultaneously using text and speech recognition to compare user-supplied search criteria with broadcast material on the same broadcast band as well as other analog and/or digital bands/frequencies in a background operating mode.

BACKGROUND OF THE INVENTION

Conventional receivers allow a user to monitor a particular selected broadcast frequency. Program material signals detected on the selected broadcast frequency can be indicative of one of the following: purely audio information; audio and text/data information; audio and video information; audio, video and text/data information; video and text information; or purely text/data information. The receiver decodes the detected signals and outputs the program material to an audio and/or video reproduction device. In each of these uses, a user can only monitor the particularly selected broadcast frequency to which the receiver is tuned. If the user is not satisfied with the program material, the receiver can be tuned to another frequency. That is, the user can only search for new program material by monitoring the receiver's current output.

U.S. Pat. No. 5,457,815 recognized the desire of a user to check other broadcast frequencies on a broadcast band for more desired/appropriate program material while simultaneously enjoying the program on one broadcast frequency. The disclosed system is based on the availability of a radio broadcast data system (RBDS). RBDS is a means by which radio broadcasters can transmit digital data along with their broadcast signal to "smart" receivers capable of performing a variety of automatic functions. Briefly, the RBDS signal is located on a subcarrier frequency of 57 kHz. The disclosed system's broadcast receiver is tuned to a selected broadcast frequency. A first of two RBDS receivers operates in a locked mode to receive RBDS data associated with the selected broadcast frequency. Simultaneously, the second of the two RBDS receivers operates in a scanning mode to scan RBDS data associated with all broadcast frequencies. Match criteria corresponding with one or more categorical portions of RBDS data is compared with the RBDS signal associated with each broadcast frequency scanned by the RBDS receiver operating in the scanning mode. Each time a match occurs, the broadcast receiver can optionally be switched from the selected frequency to the broadcast frequency on which the match occurred while the first and second RBDS receivers switch operating modes. However, this system is limited to a single (RBDS) broadcast band.

More recently, U.S. Pat. No. 6,011,854 disclosed an audio processing system that searches for information reports or updates (such as traffic, weather, time, sports, news and the like) broadcast over one or several radio stations. The search is based on at least one keyword (such as "traffic", "weather", "time", "sports", "news" depending on the desired report) being preselected by the user, and being entered into the audio processing system. Speech recognition software used by the audio processing system scan radio stations for the requested information report while the user may listen to other audio sources such as a CD or a tape.

Once the requested information report is detected based on the entered keyword used in the radio broadcast, the audio processing system automatically switches its audio output to the radio station transmitting the desired broadcast. However, this system is limited to operation with conventional analog broadcast signals. The system also assumes that the user wants to switch over to the radio broadcast on which the match was found. Furthermore, the disclosure does not provide any teaching or suggestion as to how the user can listen to one radio broadcast while other radio stations are being searched.

SUMMARY OF THE INVENTION

Accordingly, it is an object of the present invention to provide a system and method that will allow a user to listen to material broadcast on a one-way broadcast band or two-way communications band while searching a number of broadcasts on the same and other one-way or two-way bands.

Another object of the present invention is to provide a system and method for simultaneously listening to one broadcast while receiving and searching for desired programming on a plurality of analog and/or digital broadcast bands.

Still another object of the present invention is to provide a system and method for listening to one broadcast while simultaneously performing other tasks in a background operational mode.

A still further object of the present invention is to provide a system and method for listening to one broadcast while simultaneously providing for the transmission/reception of wireless messages.

Other objects and advantages of the present invention will become more obvious hereinafter in the specification and drawings.

In accordance with the present invention, a broadcast audio receiver system and audio processing method for use therewith are provided. The system includes a plurality of pairs of receivers. Each pair receives broadcasts on a unique broadcast band defined by a broadcast signal that is one of an analog audio signal or a digital audio signal. A decoder is coupled to each receiver for converting the broadcast signal received thereby to a character representation thereof. For an analog broadcast, the decoder uses speech recognition to convert the analog signal to its character representation. Input controls include those for receiving a user-selected frequency on a selected broadcast band and search criteria. A controller is coupled to the receivers, the input controls and an audio output device. The controller governs a number of receiver operations to include: i) tuning one of the receivers to the user-selected frequency to become a tuned receiver, ii) coupling the tuned receiver to the audio output device whereby all other receivers are not coupled to the audio output device, iii) scanning the broadcast band associated with each of the receivers not coupled to the audio output device, iv) comparing the character representation of the broadcast signal with the search criteria for each of the other receivers not coupled to the audio output device, and v) generating a match signal when the search criteria is present to thereby define a match frequency on a match broadcast band indicating that the search criteria is present. A visual and/or audio announcement is generated in response to the match signal. If the input controls further receive a match select signal from the user, the controller uncouples the tuned receiver from the audio output device and couples a designated one of the receivers capable of receiving the match frequency to the audio output device. The previously tuned receiver then assumes a function that is the same as the other receivers not coupled to the audio output device.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
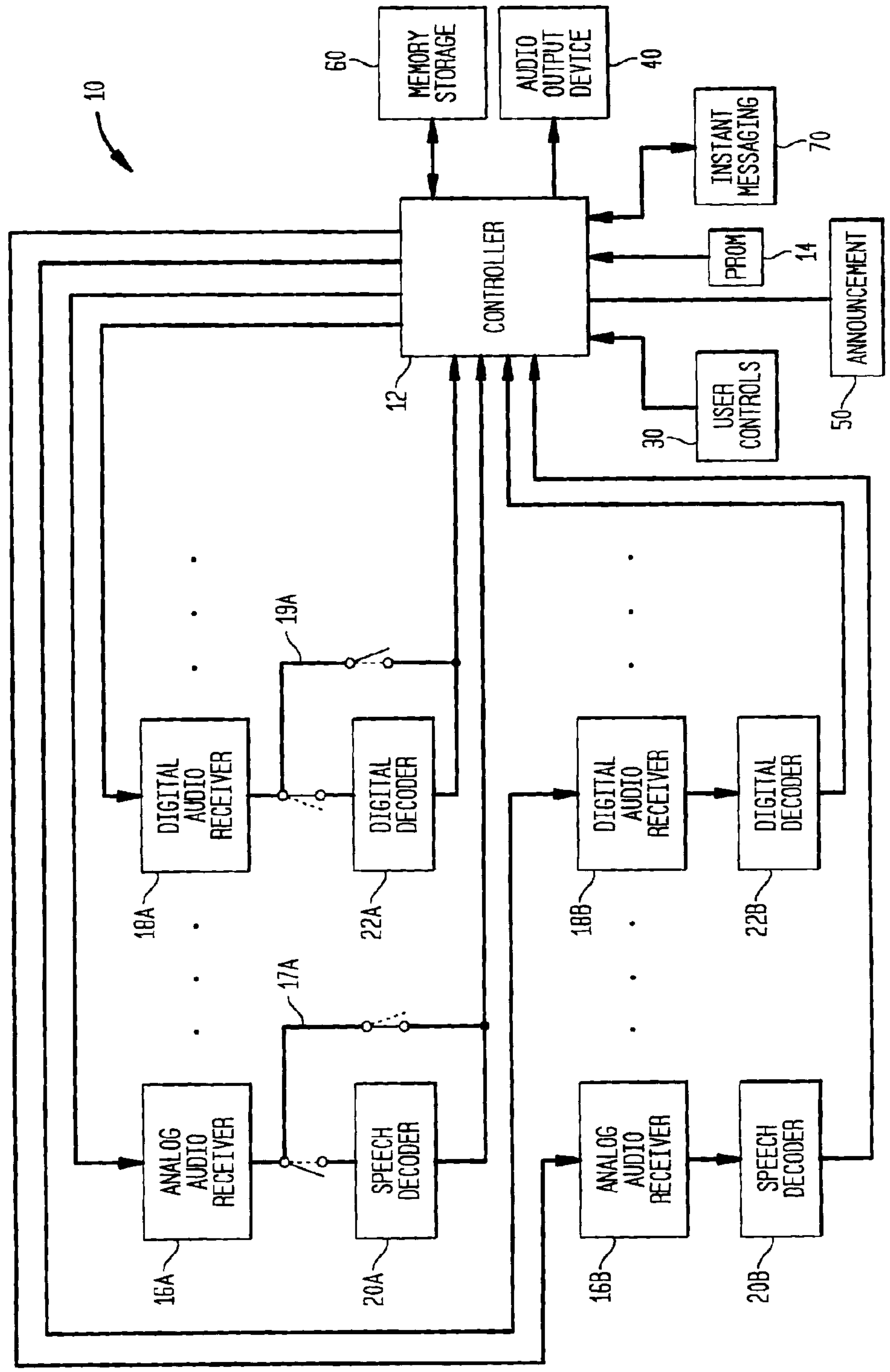
FIG. 1 is a top-level block diagram of an embodiment of a broadcast audio receiver system according to the present invention.

Referring now to the drawings, and more particularly to FIG. 1, a broadcast audio receiver system according to the present invention is referenced generally by numeral 10. By way of illustrative example, broadcast audio receiver system 10 will be described in terms of a mobile system (i.e., one used in a vehicle). However, it is to be understood that system 10 could also be used in a non-mobile setting.

System 10 will be described primarily with respect to its handling of broadcast material and wireless messages as sources. However, it is to be understood that system 10 can have a variety of other source media (e.g., tape player, CD player, MP3 player, etc.) coupled thereto for foreground operation. Thus, the choice and/or number of other such source media is not to be considered a limitation on the present invention.

System 10 includes a controller 12 which can be preprogrammed internally or programmed by instruction contained on a programmable read only memory (PROM) 14 coupled to controller 12. PROM 14 could be removable to allow for program updates/changes. As will be explained further below, controller 12 controls a number of foreground and background tasks of system 10. Coupled to controller 12 are pairs of identical receivers such as pairs 16A/16B and 18A/18B. Pair 16A/16B is representative of a pair of identical receivers that receive some form of an analog audio signal. For example, each of receivers 16A and 16B could be an AM receiver capable of receiving the AM band's broadcast signal. (Note that a typical embodiment of the present invention would also include a pair of FM receivers.) Pair 18A/18B is representative of a pair of identical receivers that receive some form of a digital audio signal. For example, each of receivers 18A and 18B could be capable of receiving broadcasts on one of the digital broadcast bands such as In-Band On Channel (IBOC), 2.3 GHz, 1.5–1.6 GHz, digital cellular, digital wireless, digital satellite or digital television broadcast bands. Further, the receivers used could be capable of receiving broadcasts on two-way communications bands such as the Family Radio Service (FRS) band.

While only two pairs of identical receivers are shown for clarity of illustration, it is to be understood that additional receiver pairs of each of the analog and digital type are contemplated by the present invention. Thus, the choice and number of analog audio receiver pairs and digital audio receiver pairs is not a limitation of the present invention.

In terms of analog audio receivers 16A and 16B, speech recognition decoders 20A and 20B, respectively, are coupled to the outputs thereof. Decoders 20A and 20B convert the respective receiver's analog audio signal output to a character representation thereof such as the ASCII character representation. Such conversion is well understood in the art, and will not be described further herein. In terms of digital audio receivers 18A and 18B, digital decoders 22A and 22B, respectively, likewise convert the respective receiver's digital audio signal output to the same character representation (e.g., ASCII) produced by decoders 20A and 20B. Accordingly, controller 12 receives the same (ASCII) character representations of received audio signals for background processing (as will be explained further below) regardless of a broadcast band's configuration of the audio signal. This simplifies the background processing for controller 12.

Additional peripherals coupled to controller 12 includes a user controls block 30, an audio output device 40 (e.g., one or more speakers), an announcement block 50, a memory storage block 60, and an instant messaging block 70. Each of these blocks will be described briefly below with their relevant functions becoming apparent in the operational description of the present invention.

Figure 2:
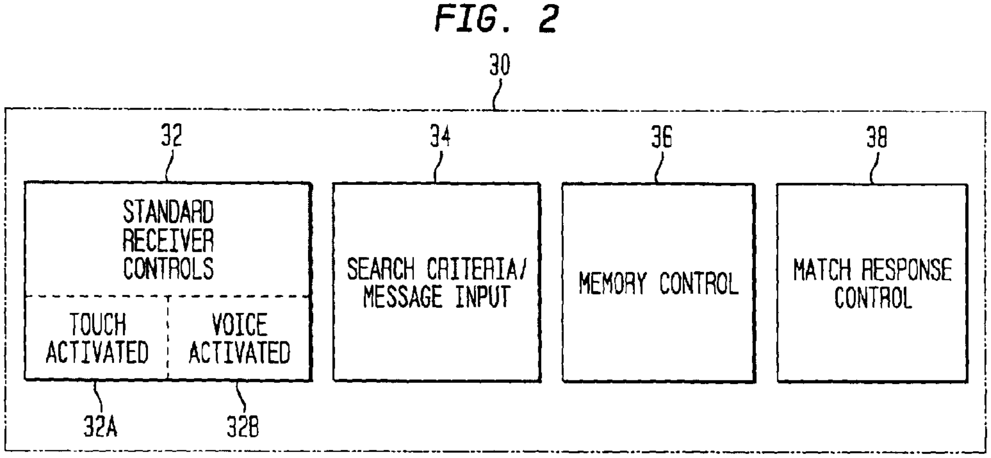
FIG. 2 is a block diagram of the user controls block.

User controls block 30 can contain a number of user-accessible controls providing both foreground and background operating instructions for controller 12. For example, as illustrated in FIG. 2, user controls block 30 includes standard receiver controls 32 for controlling the foreground or listening operation of system 10. That is, standard receiver controls 32 control the selection and audio control of audio source (e.g., a radio or other broadcast frequency, tape player, CD player, etc.) that is to be coupled directly to audio output device 40. Standard receiver controls 32 can include one or both of touch-activated controls 32A (e.g., buttons, slides, dials, etc. coupled directly or by wireless remote to controller 12) and voice-activated controls 32B.

User controls block 30 also incorporates a number of controls used in the background operation of the present invention. For example, a search criteria/message input 34 provides the means to either enter various search criteria that will be used in background processing or message information for wireless transmission from system 10. The output format should be the same character representation as that used for the converted broadcast signals output from decoders 20A, 20B, 22A and 22B. A memory control 36 is provided/used to control the storage/recall/erasure of broadcast data on memory 60. A match response control 38 is provided/used to provide a user-selected response to the announcement of a broadcast data match as will be explained further below. As with standard receiver controls 32, search criteria/message input 34, memory control 36 and match response control 38 can be touch and/or voice activated controls.

Figure 3:
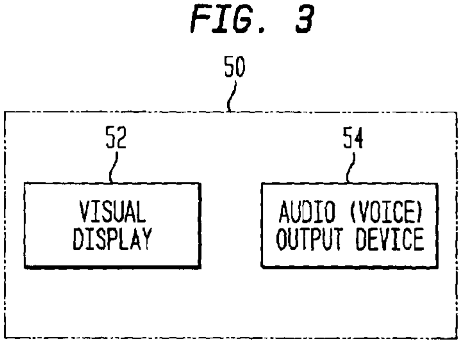
FIG. 3 is a block diagram of the announcement block.

Announcement block 50, illustrated in FIG. 3, provides a visual display 52 and/or an audio/voice output device 54. Visual display 52 provides for the display of text material and device 54 provides for an audio indication (e.g., tone, electronic voice, etc.) that text material is being displayed on visual display 52.

Figure 4:
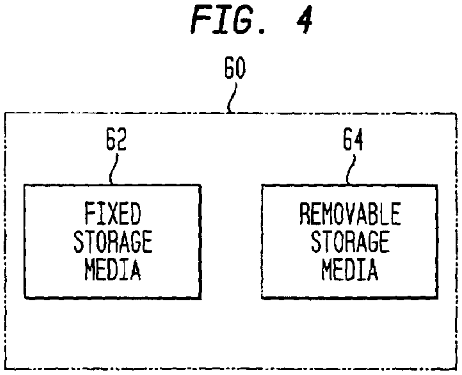
FIG. 4 is a block diagram of the memory storage block.

Memory storage block 60, illustrated in FIG. 4, can include one or both of fixed storage media 62 and removable storage media 64. Fixed storage media 62 could serve as a temporary storage area for certain broadcast material as will be explained further below. Removable storage media 64 can also be used to store broadcast material in a form that is subsequently removable by the user.

Figure 5:
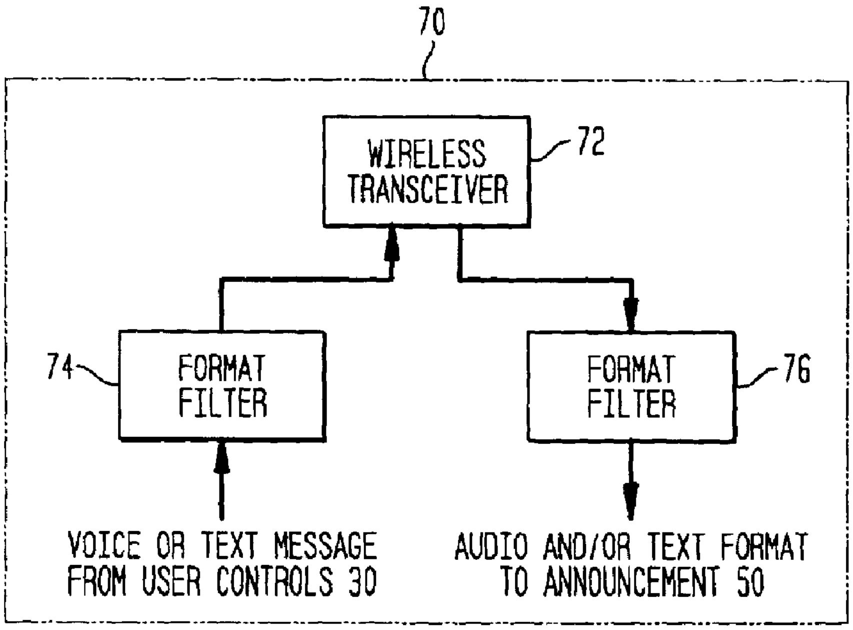
FIG. 5 is a block diagram of the instant messaging block.

Instant messaging block 70, illustrated in FIG. 5, includes a wireless transceiver 72 capable of transmitting text messages over the air waves in a fashion well understood in the art. In terms of transmitting messages, a formatting filter 74 receives a voice or text (to be sent) that is input by the user via search criteria/message input 34 of user controls block 30. If the message is a voice message, format filter 74 converts same into a text message format suitable for wireless transmission by wireless transceiver 72. One speech-to-text conversion methodology is described in U.S. Pat. No. 6,151,572. If the message is a text message, formatting filter 74 may only need to add "header" type information in order to place it in a format suitable for wireless transmission.

In terms of receiving messages, wireless transceiver 72 supplies its received messages to another format filter 76 which formats the received messages for audio and/or video/text display via announcement block 50 by way of controller 12.

Figure 6:
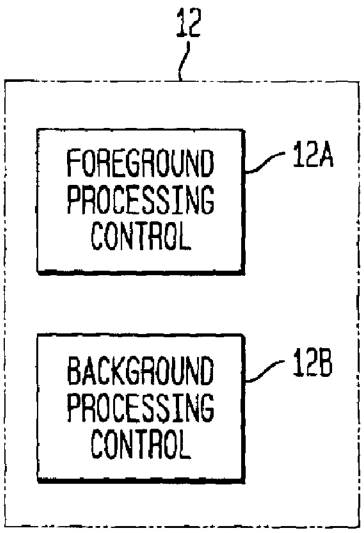
FIG. 6 is a block diagram illustrating separate foreground and background processing control for the controller in FIG. 1.

As mentioned above, controller 12 handles foreground processing control of the broadcast material (or other audio media not illustrated in the drawings) that is to be reproduced via audio output device 40. Further, controller 12 handles a number of background tasks where the term "background" as used herein refers to any tasks not associated with sound reproduction by audio output device 40. Accordingly, as illustrated in FIG. 6, controller 12 can be considered to include a foreground processing control 12A and background processing control 12B. It is to be understood that controls 12A and 12B can be implemented with separate hardware/software or the same hardware operating separate software control routines.

In describing the operation of system 10, it will be assumed that the user thereof selects a particular frequency on a particular broadcast band for purposes of listening to the associated broadcast material. However, as mentioned above, it is to be understood that system 10 also contemplates a user's foreground selection of another audio reproduction media (e.g., tape, CD, etc.) thereby relegating all receivers in system 10 initially to a background operation.

For purpose of illustration, it will be assumed that the user has decided to listen to a band/frequency receivable by each of analog audio receivers 16A and 16B. Accordingly, one of receivers 16A and 16B is selected to operate in the foreground such that the receiver's output is supplied to audio output device 40. Either of receivers 16A and 16B could be designated to operate in the foreground. However, for simplicity, one of receivers 16A and 16B will be designated as the foreground receiver. In particular, FIG. 1 assumes that all the "A" receivers will be used as the foreground receivers when their respective broadcast band is selected. Accordingly, the "A" receivers have a bypass circuit 17A and 19A that allows the corresponding decoder to be bypassed so that the broadcast signal is supplied to audio output device 40 as opposed to being converted to the character representation thereof. In the current example, bypass circuit 17A will be selected by controller 12 (i.e., foreground processing control 12A) so that the broadcast signal received by receiver 16A is supplied to audio output device 40. The remaining "A" and "B" receivers are under the operational control of background processing control 12B.

In general, background processing control 12B causes all of its receivers (e.g., receivers 16B, 18A and 18B in the illustrated example) to search for some user-supplied search criteria. The search criteria can be in the form of single words (e.g., "traffic", "weather", "stocks", etc.), or phrases, or codes that would be found in broadcast material of interest. When the search criteria is found on a broadcast band/frequency, an announcement is made by system 10 and the user is given the opportunity to switch foreground operation of system 10 to the broadcast band/frequency yielding a "match" with the search criteria. The details of this operation will now be explained with simultaneous reference to FIGS. 1–6.

Accessing standard receiver controls 32, a user selects a broadcast band/frequency receivable by (in this example) receiver 16A. Foreground processing control 12A activates bypass circuit 17A so that decoder 20A is bypassed with the broadcast signal being coupled to audio output device 40. The user also inputs search criteria via search criteria/message input 34. The search criteria is utilized by background processing control 12B in comparisons with the (ASCII) character representations of the broadcast signals originating from receivers 16B, 18A and 18B.

More specifically, background processing control 12B causes each of receivers 16B, 18A and 18B to operate in a scan mode, i.e., automatic and continuous tuning to frequencies on which an acceptable signal level is achieved. Such scanning control is well known in the art of broadcast receivers. Since receivers 18A and 18B are identical, each receiver could scan one-half of the band or each receiver could start scanning at a different frequency. A selected amount of time (e.g., 10, 20, 30 seconds, etc.) is spent on each scanned frequency with the (ASCII) character representation of the corresponding broadcast signal being compared with the user-selected search criteria.

If/when the search criteria is present in a broadcast signal, a match signal is issued by background processing control 12B to announcement block 50 whereby an indication of the match is displayed and/or made known audibly. To give a user sufficient time to respond to a match, background processing control 12B could delay further scanning operation for a selected period of time such as 1 or 2 minutes. If no user input is received via match response control 38 within this delay time, the scanning operation is resumed and announcement block 50 is cleared. The user could elect to keep listening to receiver 16A and record the broadcast material associated with the match. If this is the case, match response control 38 is activated to issue a "store" command to background processing control 12B which will route one or both of the broadcast signal and its (ASCII) character representation thereof to memory storage block 60. The stored broadcast material can then retrieved or erased at a later time using memory control 36.

The user can also elect to switch the foreground operation of system 10 to the broadcast band/frequency on which the search criteria was found. In this case, match response control 38 is activated to issue a "switch" command to foreground processing control 12A. For purpose of the illustrative example, it will be assumed that the match was found on a broadcast band other than that of receiver pair 16A/16B (e.g., match found on the band received by receiver pair 18A/18B). Control 12A then uncouples (in this case) receiver 16A from audio output device 40 and deactivates bypass circuit 17A. Control 12A further activates bypass circuit 19A and couples receiver 18A to audio output device 40 whereas receiver 16A returns to the operational control of background processing control 12B. Note that if a match is found on the same band as is being currently listened to, foreground processing control 12A merely re-tunes the current foreground receiver in response to a "switch" command from match response control 38.

The advantages of the present invention are numerous. A user can listen to one broadcast program while simultaneously searching for another desirable program on the same and other broadcast bands. Provisions are made to synthesize any type of broadcast signal (e.g., analog, digital, etc.) into the same character representation thereof (e.g., ASCII) so that comparisons with a similarly represented search criteria can be arrived at quickly and efficiently. The user can listen to a program while simultaneously carrying out a number of background tasks to include the above-noted searching and transmission/reception of wireless messages. The system and method disclosed herein can be adapted to any mobile or stationary broadcast audio receiver.

Although the invention has been described relative to a specific embodiment thereof, there are numerous variations and modifications that will be readily apparent to those skilled in the art in light of the above teachings. For example, while the search comparisons have been described herein as being carried out using ASCII character representations of both the broadcast signals and search criteria, it is to be understood that other character representations could be used. Further the present invention can be adapted for use with any current or future broadcast band. It is therefore to be understood that, within the scope of the appended claims, the invention may be practiced other than as specifically described.

What is claimed as new and desired to be secured by Letters Patent of the United States is:

1. A broadcast audio receiver system, comprising:

a plurality of pairs of receivers, each pair of said plurality of pairs receiving broadcasts on a unique broadcast band defined by a broadcast signal that is one of an analog audio signal or a digital audio signal;

a decoder coupled to each of said receivers for converting each said broadcast signal to a character representation thereof, wherein said decoder is a speech recognition decoder when said broadcast signal is said analog audio signal, and wherein said decoder is a digital decoder when said broadcast signal is said digital audio signal;

input controls for receiving, from a user, a selected frequency on a selected broadcast band and search criteria;

an audio output device;

control means coupled to said receivers, said input controls and said audio output device for:

i) tuning one of said receivers to said selected frequency, ii) coupling said one of said receivers to said audio output device wherein all others of said receivers are not coupled to said audio output device, iii) scanning said broadcast band associated with each of said all others of said receivers, iv) comparing said character representation of said broadcast signal with said search criteria for each of said all others of said receivers, v) generating a match signal when said search criteria is present in said character representation for one receiver from said all others of said receivers to thereby define a match frequency on a match broadcast band where said search criteria is present;

means, coupled to said control means, for generating an announcement in response to said match signal;

said input controls further being capable of receiving a match select signal from the user; and said control means, in response to said match select signal, uncoupling said one of said receivers from said audio output device and coupling a designated one of said receivers capable of receiving said match frequency on said match broadcast band to said audio output device wherein said one of said receivers assumes a function that is the same as said all others of said receivers.

2. A system as in claim 1 further comprising memory for storing at least one of said broadcast signal received on said match frequency and said character representation corresponding thereto.

3. A system as in claim 1 wherein said means for generating an announcement generates at least one of an audio announcement and a video announcement in response to said match signal.

4. A system as in claim 1 wherein said input controls comprise at least one of controls activated by touch and controls activated by voice.

5. A system as in claim 1 wherein said input controls are capable of receiving one of a voice message and a text message from the user, and wherein said means for generating an announcement can display text, said system further comprising a wireless messaging module for sending and receiving messages over the air waves, said wireless messaging module coupled to said control means, said wireless messaging module comprising:

a filter for converting said one of a voice message and a text message to a format suitable for wireless transmission; and a wireless transceiver for transmitting said one of a voice message and a text message in said format, and for receiving a wireless text message, said wireless transceiver supplying said wireless text message to said control means for routing to said means for generating an announcement wherein said wireless text message is displayed as text.

6. A broadcast audio receiver system, comprising:

a plurality of pairs of receivers, each pair of said plurality of pairs receiving broadcasts on a unique broadcast band defined by a broadcast signal that is one of an analog audio signal or a digital audio signal;

a decoder coupled to each of said receivers for converting each said broadcast signal to a character representation thereof;

input controls for receiving, from a user, a selected frequency on a selected broadcast band and search criteria;

an audio output device;

foreground control means for coupling one of said receivers capable of receiving said selected frequency to said audio output device wherein said broadcast signal associated therewith is audible and wherein said broadcast signal associated with each of all others of said receivers is not audible;

background control means having operational control over said all others of said receivers such that each said broadcast band associated therewith is examined to determine whether said search criteria is present in said character representation, and for generating a match signal when said search criteria is present in said character representation for one receiver from said all others of said receivers to thereby define a match frequency on a match broadcast band where said search criteria is present;

means, coupled to said background control means, for generating an announcement in response to said match signal;

said input controls further being capable of receiving a match select signal from the user;

said foreground control means, in response to said match select signal, uncoupling said one of said receivers from said audio output device and coupling a designated one of said receivers capable of receiving said match frequency on said match broadcast band to said audio output device; and said background control means assuming said operational control over said one of said receivers uncoupled from said audio output device.

7. A system as in claim 6 wherein said decoder is a speech recognition decoder when said broadcast signal is said analog audio signal, and wherein said decoder is a digital decoder when said broadcast signal is said digital audio signal.

8. A system as in claim 6 further comprising memory coupled to said background control means for storing at least one of said broadcast signal received on said match frequency and said character representation corresponding thereto.

9. A system as in claim 6 wherein said means for generating an announcement generates at least one of an audio announcement and a video announcement in response to said match signal.

10. A system as in claim 6 wherein said input controls comprise at least one of controls activated by touch and controls activated by voice.

11. A system as in claim 6 wherein said input controls are capable of receiving one of a voice message and a text message from the user, and wherein said means for generating an announcement can display text, said system further comprising a wireless messaging module for sending and receiving messages over the air waves, said wireless messaging module coupled to said background control means, said wireless messaging module comprising:

a filter for converting said one of a voice message and a text message to a format suitable for wireless transmission; and a wireless transceiver for transmitting said one of a voice message and a text message in said format, and for receiving a wireless text message, said wireless transceiver supplying said wireless text message to said background control means for routing to said means for generating an announcement wherein said wireless text message is displayed as text.

12. An audio processing method for a broadcast audio receiver system having a plurality of pairs of receivers, each pair of which receives broadcasts on a unique broadcast band defined by a broadcast signal that is one of an analog audio signal or a digital audio signal that can be reproduced by an audio output device, said method comprising the steps of:

converting each said broadcast signal to a character representation thereof; wherein said step of converting includes the step of performing speech recognition processing when said broadcast signal is said analog audio signal;

tuning one of said receivers to a user selected frequency;

coupling said broadcast signal associated with said one of said receivers to said audio output device wherein all others of said receivers are not coupled to said audio output device;

scanning said broadcast band associated with each of said all others of said receivers;

comparing said character representation of said broadcast signal with said search criteria for each of said all others of said receivers;

generating a match signal when said search criteria is present in said character representation for one receiver from said all others of said receivers to thereby define a match frequency on a match broadcast band where said search criteria is present;

announcing the generation of said match signal;

receiving a match select signal from the user; and uncoupling said one of said receivers from said audio output device in response to said match select signal;

coupling a designated one of said receivers capable of receiving said match frequency on said match broadcast band to said audio output device in response to said match select signal; and performing said steps of scanning and comparing for said one of said receivers so-uncoupled.

13. A method according to claim 12 further comprising the step of storing at least one of said broadcast signal received on said match frequency and said character representation corresponding thereto.

14. A method according to claim 12 wherein said step of announcing comprises the step of generating at least one of an audible manifestation and a visible manifestation of said match signal.

15. A method according to claim 12 wherein said character representation is an ASCII character representation.

* * * * *